(12) United States Patent
Koepl

(10) Patent No.: US 10,194,045 B2
(45) Date of Patent: Jan. 29, 2019

(54) PRINTER POWER MANAGEMENT

(71) Applicant: Hewlett-Packard Development Company, L.P., Houston, TX (US)

(72) Inventor: Devin Koepl, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/748,381

(22) PCT Filed: Sep. 30, 2015

(86) PCT No.: PCT/US2015/053217
§ 371 (c)(1),
(2) Date: Jan. 29, 2018

(87) PCT Pub. No.: WO2017/058203
PCT Pub. Date: Apr. 6, 2017

(65) Prior Publication Data
US 2018/0227453 A1  Aug. 9, 2018

(51) Int. Cl.
*H04N 1/00* (2006.01)
*G06F 1/32* (2006.01)
*G06F 11/30* (2006.01)

(52) U.S. Cl.
CPC ........... *H04N 1/00899* (2013.01); *G06F 1/32* (2013.01); *G06F 1/3284* (2013.01); *G06F 11/3013* (2013.01); *G06F 11/3062* (2013.01); *H04N 1/00068* (2013.01); *G06F 2201/835* (2013.01)

(58) Field of Classification Search
USPC ....................................................... 358/1.14
See application file for complete search history.

(56) References Cited

U.S. PATENT DOCUMENTS

| | | | |
|---|---|---|---|
| 6,393,233 B1 | 5/2002 | Soulier | |
| 6,408,149 B1 | 6/2002 | Taira et al. | |
| 6,470,157 B2 | 10/2002 | Taneko | |
| 7,240,334 B1 | 7/2007 | Fluke et al. | |
| 7,669,071 B2 | 2/2010 | Cochran et al. | |
| 7,773,929 B2 | 8/2010 | Kitami et al. | |
| 8,576,433 B2 | 11/2013 | Matsumoto | |
| 9,067,337 B2 | 6/2015 | Nagasaki | |
| 2005/0146546 A1 | 7/2005 | Godil et al. | |

(Continued)

FOREIGN PATENT DOCUMENTS

EP   2608514   6/2013

OTHER PUBLICATIONS

Kontorinis, et al. Reducing Peak Power with a Table-Driven Adaptive Processor Core ~ MICRO '9 ~ Dec. 2009 ~ 12 pages.

*Primary Examiner* — Ngon Nguyen
(74) *Attorney, Agent, or Firm* — Brooks Cameron & Huebsch, PLLC

(57) ABSTRACT

Example implementations relate to printer power management. For example, a system for printer power management may include a system power control engine to receive a power usage estimate from each of a plurality of components of a printing device and schedule a deferred service routine to identify a level of real-time performance of the plurality of components. Furthermore, a system for printer power management may include a state machine engine to estimate how close a power supply coupled to the printing device is to an over-power failure (OPF) based on the real-time performance.

15 Claims, 5 Drawing Sheets

(56) References Cited

U.S. PATENT DOCUMENTS

| | | | |
|---|---|---|---|
| 2006/0182458 A1* | 8/2006 | Hall | G03G 15/2039 399/88 |
| 2008/0086655 A1 | 4/2008 | Shipton et al. | |
| 2011/0191609 A1* | 8/2011 | Van Bokhoven | G06F 1/3203 713/310 |
| 2011/0304876 A1* | 12/2011 | Coffey | G03G 15/5004 358/1.15 |
| 2012/0057894 A1 | 3/2012 | Tress et al. | |

\* cited by examiner

PRINTER POWER MANAGEMENT

BACKGROUND

Printing devices may include a plurality of components with dynamic power requirements. The power used by each of these components may be monitored and/or managed based on a variety of factors. In some instances, the printer power usage may exceed power supply output capability resulting in an over-power failure (OPF).

DETAILED DESCRIPTION

Figure 1:
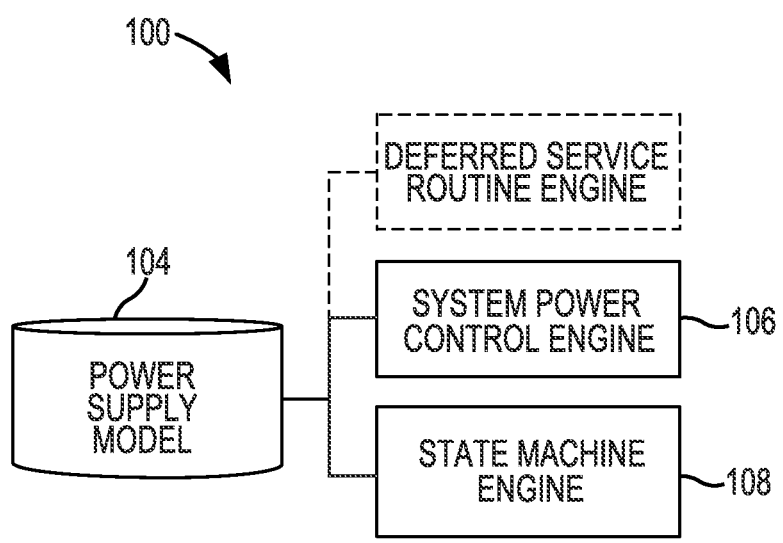
FIG. 1 illustrates a diagram of an example of a system for printer power management according to the present disclosure.

Printing devices, such as three-dimensional (3D) printers and/or two-dimensional (2D) printers may contain a number of components. As used herein, a component of a printing device refers to a physical element, such as a motor, which is incorporated in, attached to, or otherwise a part of a printing device.

In a printer, the power usage of a single motor may be sufficient to cause an over-power failure (OPF). Devices may have several motors, as well as other components with dynamic power requirements, such that their total potential power requirement is many times greater than the output capability of their power supplies. Therefore, component power usages may be carefully budgeted and scheduled to limit total power, especially in complex printing devices. However, if a component uses more power than expected, because, for example, it is a motor and must overcome the unexpected drag of jammed media, or the power requirements of components overlap unexpectedly, an OPF may occur.

OPFs may be difficult to troubleshoot and may result in poor customer experiences. As used herein, an OPF refers to a decrease in function of a device resulting from power usage exceeding power supply capability. For example, when the output capabilities of a power supply are exceeded, the output voltage of the power supply may decrease causing embedded systems to reset. Additionally and/or alternatively, when the output capabilities of the power supply are exceeded, the power supply output may turn itself off in self-preservation.

Printer power management in accordance with the present disclosure estimates and monitors total printer power usage in real-time, and informs printer components of how close the printing device is to an OPF. In addition to printers, the present disclosure is equally applicable to other devices in which the combined power usage may exceed the available power provided to the device, resulting in an OPF. When the components are informed that an OPF is imminent, the components may reduce their power usage to avert the OPF. As used herein, an "imminent" OPF is an OPF that is determined to be unavoidable within a threshold period of time, absent a reduction in printer power usage. In such a manner, printer power management in accordance with the present disclosure may detect, report, and prevent OPFs that would otherwise cause printing device resets and/or leave the printing devices dark and/or unresponsive.

Also, printer power management according to the present disclosure may minimize execution time without sacrificing performance by updating power estimates when components report power usage changes. By updating estimates when power usage values change, power usage computations may be avoided during times when the operational state of the machine has not changed. By considering the power that has changed, and not the power usage of every component present in the printing device, update execution time may remain constant even as the complexity of the printing device grows. Furthermore, when power usage in the printing device is constant, printer power management, according to the present disclosure, may automatically transition from being call-driven to executing on a periodic timer tick.

FIG. 1 illustrates a diagram of an example of a system 100 for printer power management according to the present disclosure. The system 100 may include a power supply module 104, and/or a number of engines (e.g., system power control engine 106, state machine engine 108). The number of engines may be in communication with the power supply model 104 via a communication link. The system 100 may include additional or fewer engines than are illustrated to perform the various functions that will be described in further detail in connection with FIGS. 2-5.

The number of engines (e.g., system power control engine 106, state machine engine 108) may include a combination of hardware and programming, but at least hardware, to perform functions described herein (e.g., receive a power usage estimate from each of a plurality of components of a printing device, schedule a deferred service routine to determine real-time performance of the plurality of components, etc.). The number of engines may be stored in a memory resource (e.g., computer readable medium, machine readable medium, etc.) and/or stored as hard-wired program (e.g., logic). As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

The system power control engine 106 may include hardware and/or a combination of hardware and programming, but at least hardware, to receive a power usage estimate from each of a plurality of components of a printing device, and schedule a deferred service routine to determine real-time performance of the plurality of components. The system power control engine 106 may be a call-driven server that receives best guess power usage estimates as they are made by components of the printing device, and provides estimates of how close the printing device is to an OPF.

When the system power control engine 106 receives a power usage estimate from a component, the system power control engine 106 may schedule a deferred service routine. As used herein, a deferred service routine refers to a mechanism which allows high-priority tasks to defer lower-priority tasks for later execution. As used herein, a mechanism refers to hardware and/or a combination of hardware and programming, but at least hardware. In such a manner, the system power control engine 106 may schedule deferred service routines to execute in an interrupt context and take priority over, for example, all operating system threads, allowing for the detection of transient power usages in real time.

In each deferred service routine, the system power control engine 106 may maintain a history of component's power usage estimates, along with time stamps that indicate when the respective power usage estimates were obtained. Each time that components report power usage estimates to the system power control engine 106, the system power control engine 106 may determine a total power usage for the printing device, and record the time stamp associated with that total power usage value. As such, the system power control engine 106 may execute the deferred service routine for each of the plurality of components by combining the power usage estimates from all of the components to determine a total power usage, and comparing the determined total power usage with the most recent total power usage for the printing device. The estimated total power usage and the timestamp of the last component update are then used to drive state machines that estimate how close the power supply is to an OPF. Inside the power supply (e.g., power supply model 104 illustrated in FIG. 1), there may be circuits, sensors, and logic that try to prevent fires and other types of failures from too much current being drawn out of the power supply. As used herein, a state machine refers to computer executable instructions stored in memory and executable by a processor, that models the behavior of those circuits, sensors, and logic to detect when the power supply may shut off. Put another way, a state machine may be logic that may predict when the power supply may shut off. Other types of failures may include damaged parts.

In some examples, the system power control engine 106 may identify an imminent OPF, and make information about the imminent OPF available to the components in response to the imminent OPF. Put another way, the system power control engine 106 may make information about upcoming OPFs available to components, so that the components may react to approaching OPFs, without the system power control engine 106 needing to know the specific actions taken by the components. As described herein, an "imminent" OPF is an OPF that is determined to be unavoidable within a threshold period of time, absent a reduction in printer power usage. As discussed further in relation to FIG. 3, an OPF may be determined to be imminent when the total power usage exceeds a particular threshold power and/or time. In some examples, the system power control engine 106 may identify that an OPF is likely to occur, but may not exceed the threshold power and/or time associated with an imminent OPF. In such instances, various changes in power usage among the components may be implemented to reduce total power usage by the printing device without generating an error.

The state machine engine 108 may include hardware and/or a combination of hardware and programming, but at least hardware, that estimates how close the power supply is to an OPF in real-time. As described herein, the state machine engine 108 may identify an imminent OPF based on the total power usage of the printing device. Put another way, the state machine engine may identify how close the power supply is to an OPF using the updated total power usage and a time-stamp from the most recent power usage update. Although not illustrated in FIG. 1, the system 100 may include a power supply coupled to the printing device. In some examples of the present disclosure, the system power control engine 106 may estimate the amount of energy that has been dissipated by the power supply since the last deferred service routine.

In some examples, the system power control engine 106 may initiate a deferred service routine absent receiving power usage estimates from the components. For instance, when the printing device's power usage is constant, the system power control engine 106 may schedule its own deferred service routine, such that the state machine engine 108 stays up-to-date. This self-sufficiency may be achieved using an operating system thread that "wakes up" and/or initiates after a threshold period of time, such as once every second among other threshold periods of time, and schedules a deferred service routine when no components have called in since the last time the thread woke up. Notably, while FIG. 1 illustrates a single state machine engine 108, it should be noted that system 100 may include a plurality of state machines, as discussed further in relation to FIG. 3.

Figure 2:
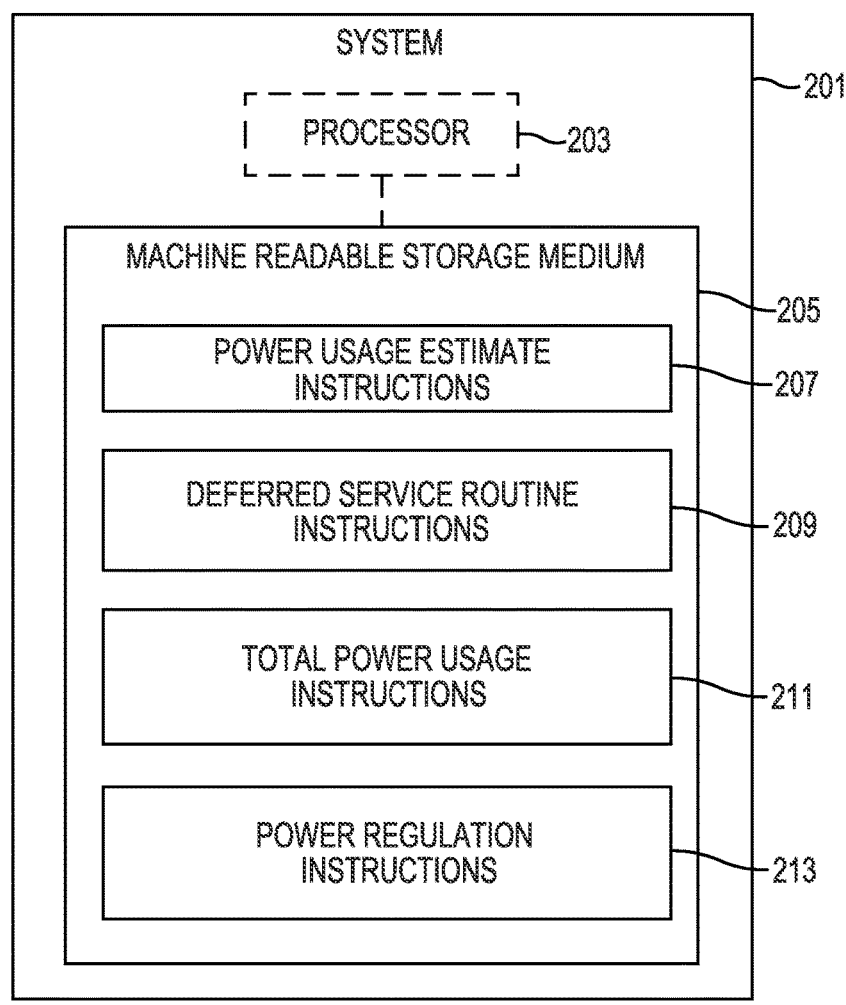
FIG. 2 is a block diagram of an example system for printer power management, according to the present disclosure.

FIG. 2 is a block diagram of an example system 201 for printer power management, according to the present disclosure. System 201 may include at least one computing device that is capable of communicating with at least one remote system. In the example of FIG. 2, system 201 includes a processor 203 and a machine-readable storage medium 205. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed) across multiple processors.

Processor 203 may be a central processing unit (CPU), microprocessor, and/or other hardware device suitable for retrieval and execution of instructions stored in machine-readable storage medium 205. In the particular example shown in FIG. 2, processor 203 may fetch, decode, and send instructions 207, 209, 211, 213 for printer power management. As an alternative or in addition to retrieving and executing instructions, processor 203 may include an electronic circuit comprising a number of electronic components for performing the functionality of the instructions in machine-readable storage medium 205. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 205 may be any electronic, magnetic, optical, or other physical storage device that stores executable instructions. Thus, machine-readable storage medium 205 may be, for example, Random Access Memory (RAM), an Electrically-Erasable Programmable Read-Only Memory (EEPROM), a storage drive, an optical disc, and the like. Machine-readable storage medium 205 may be disposed within system 201, as shown in FIG. 2. In this situation, the executable instructions may be "installed" on the system 201. Machine-readable storage medium 205 may be a portable, external or remote storage medium, for example, that allows system 201 to download the instructions from the portable/external/remote storage medium. In this situation, the executable instructions may be part of an "installation package". As described herein, machine-readable storage medium 205 may be encoded with executable instructions for printer power management.

Referring to FIG. 2, power usage estimate instructions 207, when executed by a processor (e.g., 203), may cause system 201 to receive a power usage estimate from each of a plurality of components of a printing device. For example, when power usage of the printing device is changing, such as when a print job is being executed, the system power control engine (e.g., the system power control engine 106, illustrated in FIG. 1) may be a call-driven server that receives best guess power usage estimates as they are made by printer components. Power usage estimates may be generated by each component based on their individual characteristics. For example, a motor may estimate its power usage based on its velocity, voltage, temperature and/or electro-mechanical dynamics, and may report its estimated power usage to the system power control engine. The system power control engine may use this received power usage estimate along with a previous estimate received from the particular component, to maintain an estimate of total power usage for the printing device.

Deferred service routine instructions 209, when executed by a processor (e.g., 203), may cause system 201 to schedule a deferred service routine for each of the plurality of components. As discussed above, and also in relation to FIG. 1, when the system power control engine receives a power usage estimate from a component, the system power control engine may schedule a deferred service routine, and pass its new estimate for total power usage to the state machine engine(s) (e.g., state machine engine 108, illustrated in FIG. 1). Similarly, the system power control engine 106 may pass the time-stamp of the received power usage estimate to the state machine(s), where the time-stamp indicates a time when the power usage estimate was made by the component.

Total power usage instructions 211, when executed by a processor (e.g., 203), may cause system 201 to determine total power usage for the printing device based on the real-time performance data. As discussed above, the processor may determine a total amount of power used by the printing device at a particular point in time. For instance, if the printing device included a plurality of motors, such as pen servicing motors, tray motors, paper-path motors, etc., the total amount of power used by the printer motors may be combined to determine a total power usage for the printing device at that particular point in time. Put another way, control operations for each printer motor within the printing device may execute hundreds of times per second with the highest priorities available (e.g., in an interrupt context). During each motor control interrupt, a motor control operation may update the system power control engine with its present power usage. In response to receiving this present power usage input from the motor controller, the system power control engine may check how close the printing device is to an OPF (as discussed further in relation to FIG. 3).

Power regulation instructions 213, when executed by a processor (e.g., 203), may cause system 201 to regulate power management of the printing device based on the total power usage. Put another way, power regulation instructions 213, when executed by a processor (e.g., 203), may share estimates with other systems reducing the total amount of processing required by all systems on a device by preventing duplicate calculations. For instance, after the system power control engine (e.g., system power control engine 106 illustrated in FIG. 1) updates the state machine engine (e.g., state machine engine 108), the system power control engine may estimate the amount of energy dissipated by the power supply since the last deferred service routine, and provide the amount of dissipated energy to a power supply temperature control unit when it is present. As used herein, a power supply temperature control unit refers to logic to estimate and control the temperatures of power supply components, based on the energy dissipated by the power supply.

In some examples, the power regulation instructions 213 may include instructions executable by the processor 203 to cause the processor 203 to make information about the OPF available to a component among the plurality of components in response to an identified OPF. For instance, when the system power control engine determines that the device is heading toward an OPF, motor controllers in the printing device may decelerate to a lower speed if possible, based on the system power control engine's determination, which may decrease the total power usage of the printing device. If slowing down the motor(s) is not possible and/or is not sufficient to prevent an OPF the system power control engine may make information about the OPF available to the components of the printing device that causes the motor controllers to immediately end any moves in progress, thus reducing power usage and avoiding an OPF. As used herein, a move in progress refers to movement of a component of the printing device which is currently being performed.

The machine readable storage medium 205 may include instructions executable by the processor 203 to cause the processor 203 to send the determined total power usage to a power supply temperature control unit and regulate motor controllers within the printing device using the power supply temperature control unit and in response to the determined total power usage. Put another way, the machine readable storage medium 205 may include instructions executable by the processor 203 to cause the processor to send an estimate of energy dissipated by the power supply to a power supply temperature control unit that adjusts device behavior to control power supply temperatures.

In some examples, the power regulation instructions 213 may include instructions executable by the processor 203 to cause the processor 203 to determine that a second power usage estimate has not been received within a threshold period of time, and execute an unprompted deferred service routine in response to the determination. For instance, if no components have reported an estimated power usage to the system power control engine for a threshold period of time, such as 1 second, the system power control engine may use the previous estimates of total power usage to drive the state machines and temperature models. In such a manner, the system power control engine may transition from being a call-driven server to a timer-driven task. As referred to herein, a call-driven server refers to a server that executes some function upon receiving a call, such as a notification of a change of power usage from a component. A timer-driven task refers to a task that is executed after expiration of some amount of time, as discussed in relation to FIG. 4.

Although not illustrated in FIG. 2, the machine readable storage medium 205 may include instructions executable by the processor 203 that cause the processor 203 to automatically generate reports based on the printing devices' logic detailing power usage in the printing device, OPF near misses, and system power control engine performance. As used herein, an OPF near miss refers to an OPF that was avoided by taking some specified action, such as reducing motor speed and/or stopping all moves in progress, among others.

Figure 3:
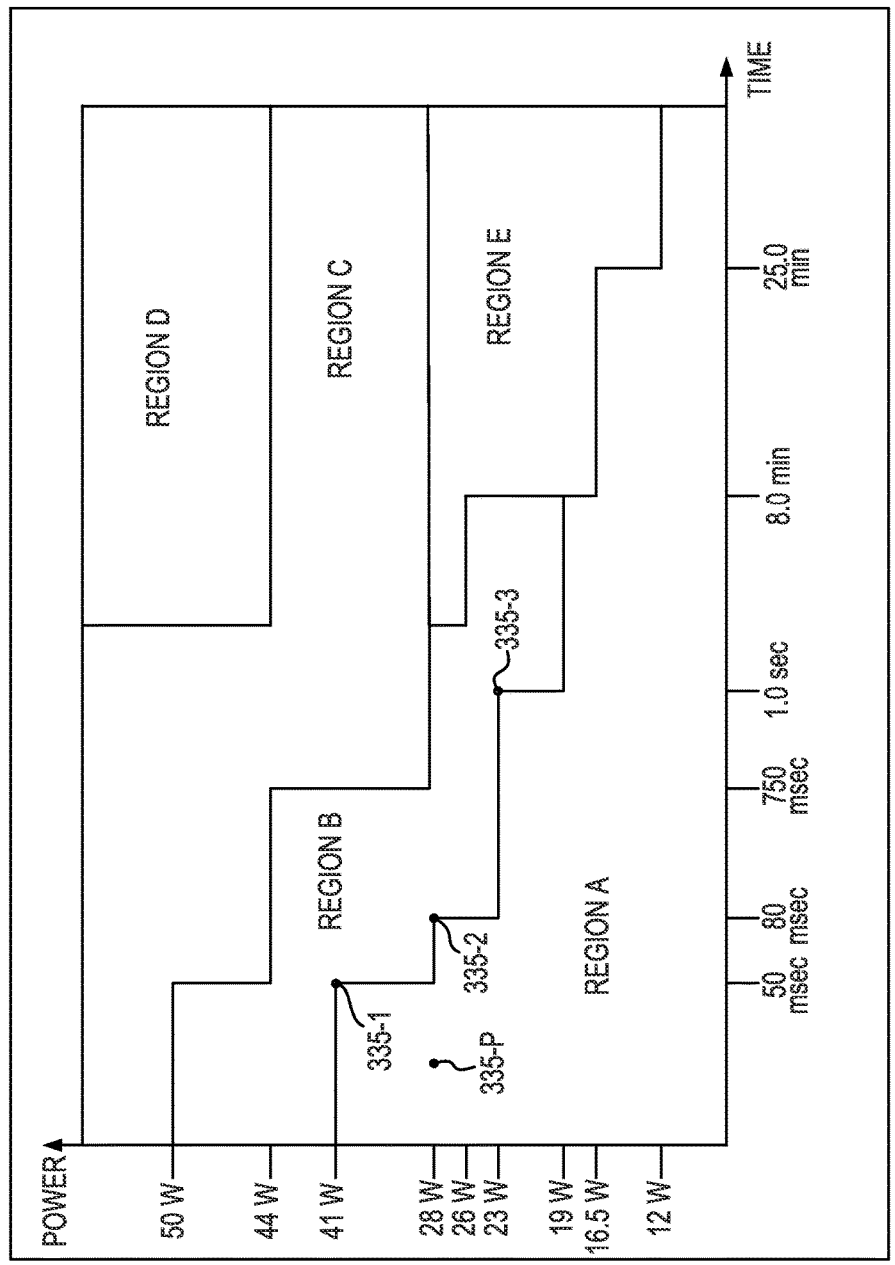
FIG. 3 illustrates an example power supply output specification according to the present disclosure.

FIG. 3 illustrates an example power supply output specification according to the present disclosure. The power supply specification may establish criteria for the operating behavior of the power supply. It may specify where the power supply is required to provide controlled voltage (Region A), where the power supply no longer is required to provide controlled voltage (Region B), where the power supply is allowed to shutdown because of temperature (Region E), where the power supply is allowed to shutdown because of power usage (Region C), and where the power supply is required to shutdown (Region E). In some examples, two state machines may be established near each outer corner of Region A. Put another way, the power supply may be required to shutdown before power usage enters Region D, and the power supply may be allowed to shutdown because of temperature in Region E.

As illustrated in FIG. 3, many output requirements and thresholds may be established for an OPF. A plurality of thresholds may be established, which clarify how close the printing device is to an over power failure. The plurality of thresholds may be modelled by state machines. Each state machine may check the total power estimate received against a threshold that the particular state machine is set to detect, and determine if the total power estimate is larger than the threshold that the state machine is assigned to detect. If the total power estimate is greater than the threshold of the particular state machine, then state machine moves from a ready state to an active state. Similarly, if the total power estimate is greater than the threshold of the particular state machine by a specified amount, then the state machine may move into the OPF imminent state. Similarly, if the total power estimate is greater than the threshold for the particular state machine for a specified period of time, then the state machine may move into the OPF imminent state. In other words, each state machine may be in a "ready" state 437-1 when the power of the printing device is on, an "active" state 437-2 when the total power estimate is greater than the threshold for the state machine, an "OPF imminent" state 437-3 when the total power estimate is greater than a second threshold, and a "recovery" state 437-4 when power usage has decreased to a point where the OPF is not imminent. The components of the printing device may periodically check the state machines, and based on those states, change power usage to avoid an OPF.

For example, "region A" illustrated in FIG. 3, may include a threshold range within which the printing device is not near an over power failure. The boundaries of region A may be monitored by various state machines 335-1, 335-2, and 335-3. For instance, state machine 335-1 may be associated with 41 watts (W) and 50 milliseconds (msec), state machine 335-2 may be associated with 28 W and 80 msec, state machine 335-3 may be associated with 23 W and 1.0 seconds (sec), and so forth. Notably, the time in the x axis may refer to the amount of time that has passed since a last update of the total power estimate.

Similarly, "region B" illustrated in FIG. 3, may include a threshold range within which the printing device at which an OPF is close, but not close enough to be imminent. The boundaries of region B may be defined by various state machines. For instance, one state machine may be associated with 50 W and 50 msec, while a second state machine may be associated with 44 W and 750 msec, and so forth. In such a manner, the boundaries of each region (e.g., region A, region B, region C, region D, and region E), may be defined by a particular state machine. Each state machine may be associated with a particular voltage and time from a previous reporting of a power usage estimate. Similarly, state machines may be included within each region to indicate that some action should be taken, but that a threshold has not been reached. For instance, state machine 335-P may be associated with 28 W and 25 msec, and may signify that motors in the printing device should decrease speed, although the total power estimate is not high enough to trigger an OPF.

In accordance with the present disclosure, the system power control engine may limit printer power usage to region A, as well as portions of region E. Each state machine may be assigned to a particular time and power. Based on output from the state machines, a position within the power supply output specification may be determined. If, for instance, the total power usage were in region D, then the power supply would be powered off. If instead, the total power usage were in region E, then the power supply may power off, and/or various components within the printing device may power off. Similarly, if the total power usage were in regions C or B, then the components within the printing device may reduce power consumption, or take no action unless it is subsequently determined that an OPF is imminent.

Figure 4:
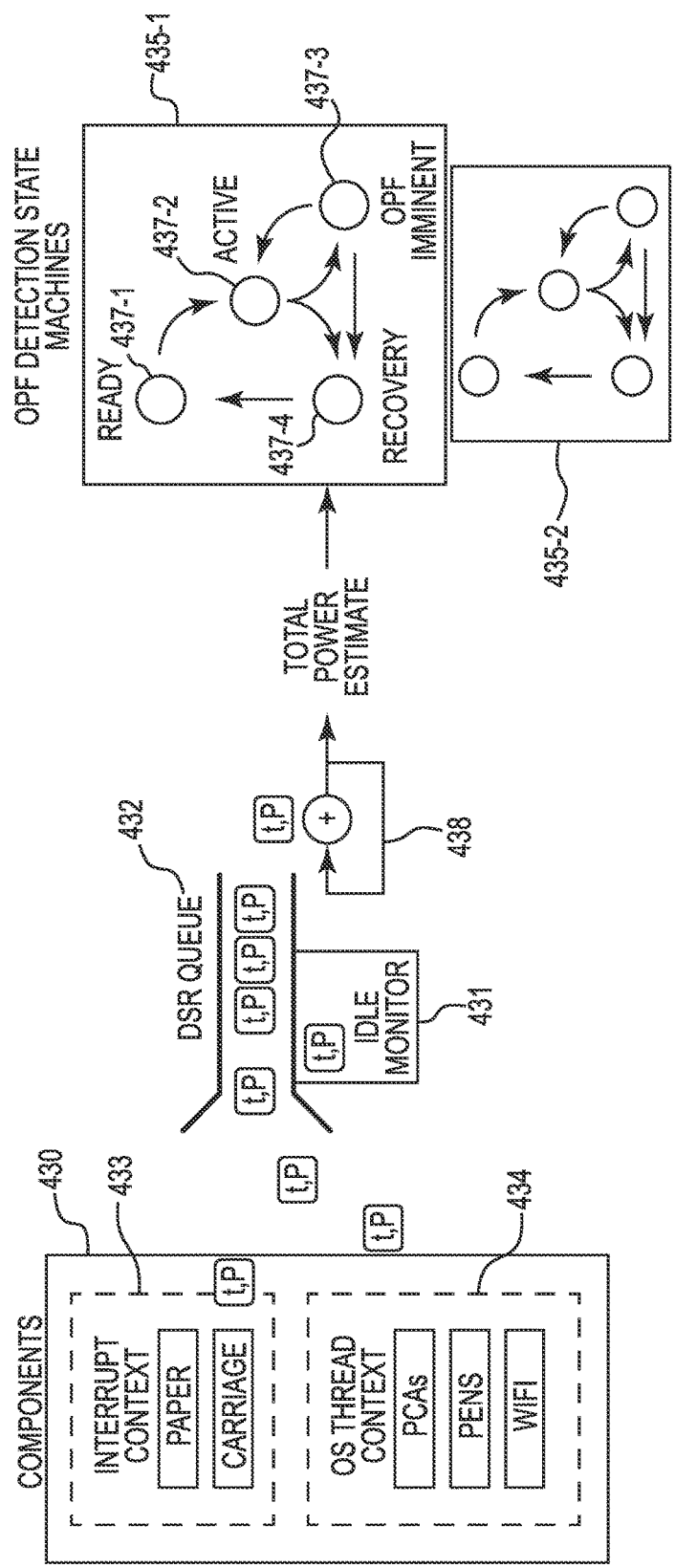
FIG. 4 illustrates an example flow chart for printer power management according to the present disclosure.

FIG. 4 illustrates an example flow chart for printer power management according to the present disclosure. As illustrated in FIG. 4, components 430 (i.e., power using components) such as paper motors and/or pens, may make estimates of their current power usage (P) that are assigned timestamps (t). Components 430 may be categorized generally as interrupt context components 433 or operating system thread context components 434. The interrupt context components 433 may be executed outside of the operating system context or in an operating system (OS) managed interrupt service routine. The OS context components 434 may be executed inside the OS, along with the deferred service routines to synchronize the asynchronous calls from various contexts. Those power estimates may be scheduled as deferred service routines by the system power control engine. As such, a deferred service routine queue 432 may be maintained, of each of the power usage updates, referred to herein as calls, received from the components 430. In other words, each of the boxes illustrated in FIG. 4 as including a "t,P" may be a call from a component 430, such that the component is reporting a change in power usage. As illustrated in FIG. 4, the deferred service routine (DSR) queue may operate as a first-in-first-out data structure that takes the calls (e.g., updates) from the components 430 and, whenever a high priority interrupt doesn't need control of the central processing unit (CPU), the CPU handles the deferred service routines in the queue while holding off on executing all the regularly scheduling OS threads until the deferred service routine queue 432 is empty. As described in relation to FIGS. 1, 2, and 3, an idle monitor thread 431 may periodically schedule deferred service routines when the system power control engine determines that no components are calling into the system power control engine with power usage estimates. The idle monitor thread 431 may initiate a deferred service routine with no power update, and drive the state machines itself. Also, the deferred service routines may be executed serially in an interrupt context ensuring real-time performance.

As described in relation to FIGS. 1, 2, and 3, power usage estimates may be used to update an estimate of total power usage for the printing device. At 438, the power usage estimate may be updated each time a call is received from a component 430 (e.g., each time power usage has changed by one of the components 430). As illustrated in FIG. 4, the estimate of total power usage for the printing device may be used to drive state machines that predict OPFs before they occur.

As illustrated in FIG. 4, OPF detection state machines, referred to generally herein as "state machines", may inform components of an imminent OPF so that the components can reduce their power usage and prevent failures. For instance, motor controllers may avert an OPF by halting any moves in progress when a state machine detects an imminent OPF. As illustrated in FIG. 4, the OPF detection state machines may determine that the printing device is in one of a plurality of states, such as "ready", such that the printing device is ready for subsequent jobs, and/or that the printing device is "active", such that a printing job is actively being performed. Similarly, the OPF detection state machines may determine that the power supply is in a state of "OPF imminent", as described herein. Similarly, the OPF detections state machines may determine that the power supply is in a state of "recovery", such that an imminent OPF was detected, but that the printing device has reduced power consumption and is recovering from a surge in power use.

The state machines may monitor power usage as it relates to the power supply specification. During printing, the state machines may asynchronously navigate their states in response to changes in power usage. There may be many of these state machines operating deep below the level where the state of the printing device is relevant. For example, on an actively printing device there may be 8 state machines, 6 of which are in their ready state and 2 of which are in their recovery state at one moment, and then a moment later, 3 may move into their active states, 1 may remain in its recovery state, and four will remain in their ready state. These state machines may be detached from the top level device state.

As illustrated in FIG. 4, the state machines (e.g., state machine engine 108 illustrated in FIG. 1) may report back to the system power control engine (e.g., system power control engine 106 illustrated in FIG. 1), that an imminent OPF is detected, and the components may take actions to reduce power consumption as described herein.

Figure 5:
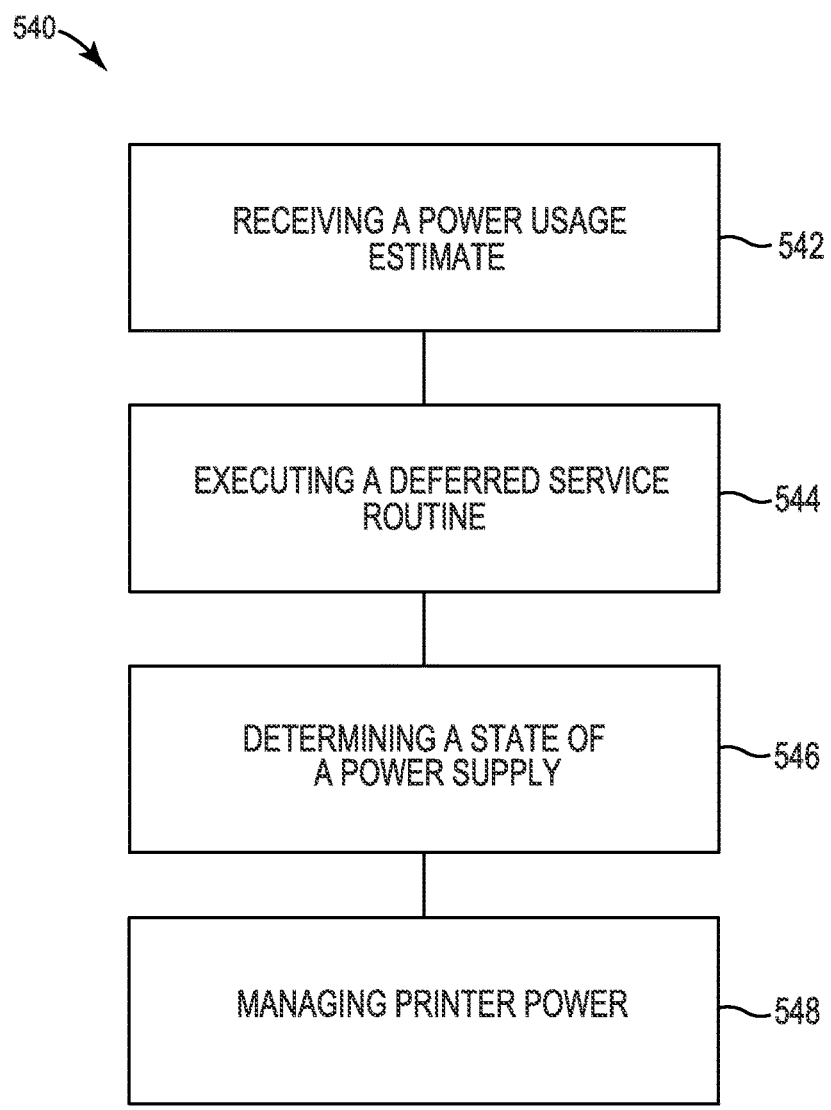
FIG. 5 illustrates an example method for printer power management according to the present disclosure.

FIG. 5 illustrates an example method 540 for printer power management according to the present disclosure. At 542, the method 540 may include receiving, by a system power control engine a power usage estimate from each of a plurality of components of a printing device. As described herein, each of a plurality of components of the printing device may report to the system power control engine, a power usage estimate, when power usage within the printing device is changing. Also, as described herein, the plurality of components may include paper motors and ink delivery systems among others. As such, receiving the power usage estimate may include receiving the power usage estimate via printer motor control operations.

At 544, the method 540 may include executing, by the system power control engine, a deferred service routine for each of the plurality of components, where the deferred service routine updates an estimate of total power usage based on the change in a component's power usage. Also, at 546, the method 540 may include determining, using a state machine, a state of the power supply relative to OPF, based on the determined real-time power usage and the power usage estimates. As used herein, to determine a state of a power supply relative to an OPF refers to determining whether any state machine is in "active" or "OPF imminent" states, such that changes to the power usage of the printing device may be needed. Put another way, the deferred service routine may provide the estimate of the total power usage to the state machines for determining how close an OPF is. Further, at 548, the method 540 may include managing printer power based on the determined state of the power supply. For instance, as illustrated in FIG. 3, each region may specify power supply behavior, and importantly, under what conditions an OPF is allowed or required to occur. Determining the state of the power supply may include determining that the OPF is likely to occur with a threshold level of certainty. It may be determined that, based on the total power usage of the printing device, an OPF is likely to occur if power usage is not reduced by the components. As such, the method 540 may include instructing, using the system power control engine, printer motors in the printing device to decelerate responsive to the determination that an OPF is likely to occur.

In some examples, determining the state of the power supply may include determining that an OPF is imminent. As such, the method 540 may include instructing, using the system power control engine, printer motors in the printing device to immediately end any moves in progress responsive to the determination.

In the foregoing detailed description of the present disclosure, reference is made to the accompanying drawings that form a part hereof, and in which is shown by way of illustration how examples of the disclosure may be practiced. These examples are described in sufficient detail to enable practice of the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature can refer to one or more of such elements and/or features.

What is claimed:

1. A system for printer power management, comprising:
a processing resource;
a memory resource having instructions stored thereon that when executed by the processing resource are to form a system power control engine and a state machine engine;
the system power control engine to:
  receive a power usage estimate from each of a plurality of components of a printing device; and
  schedule a deferred service routine to identify a level of real-time performance of the plurality of components; and
the state machine engine to:
  estimate how close a power supply coupled to the printing device is to an over-power failure (OPF) based on the real-time performance;
  identify an imminent OPF based on the estimated closeness of the OPF of the power supply, wherein the imminent OPF is identified when the real-time usage exceeds a particular threshold corresponding to the state machine engine; and
  provide information about the imminent OPF to the plurality of components to reduce power usage within a threshold period of time.

2. The system of claim 1, wherein the system power control engine schedules the deferred service routine to execute in an interrupt context and take priority over all operating system threads.

3. The system of claim 1, wherein the state machine engine identifies the imminent OPF based on a total power usage.

4. The system of claim 1, wherein the system power control engine executes the deferred service routine for each of the plurality of components by:
  comparing the power usage estimate with a previous power usage estimate for the component; and
  determining a total power usage for the printing device based on the comparison.

5. The system of claim 4, wherein the state machine engine identifies how close the power supply is to an OPF using the determined total power usage and a time-stamp of determined total power usage.

6. A non-transitory computer readable medium storing instructions executable by a processor to cause the processor to:
  receive a power usage estimate from each of a plurality of components of a printing device;
  schedule a deferred service routine for each of the plurality of components in response to receiving the power usage estimates from the plurality of components;
  determine a total power usage for the printing device indicating a level of real-time performance;
  estimate how close a power supply coupled to the printing device is to an over-power failure (OPF) based on the real-time performance;
  identify an imminent OPF based on the estimated closeness to the OPF of the power supply, wherein the imminent OPF is identified when the real-time usage exceeds a particular threshold corresponding to a state machine engine;
  provide information about the imminent OPF to the plurality of components to reduce power usage within a threshold period of time; and
  regulate power management of the printing device based on the total power usage to avoid the imminent OPF, wherein to regulate power management refers to at least one of reducing power usage of a component and shutting off a component.

7. The medium of claim 6, further comprising instructions executable by the processor to identify the imminent over-power failure (OPF) based on the total power usage, wherein the instructions executable by the processor to cause the processor to regulate power management of the printing device include instructions to:
  make information about the imminent OPF available to the component in response to identifying the imminent OPF.

8. The medium of claim 6, further comprising instructions executable by the processor to:
  send the determined total power usage to a power supply temperature control unit; and
  regulate motor controllers within the printing device using the power supply temperature control unit and in response to the determined total power usage.

9. The medium of claim 6, wherein the power usage estimate comprises a first power usage estimate, the medium further comprising instructions executable by the processor to:
  determine that a second power usage estimate has not been received within a threshold period of time; and
  initiate the deferred service routine using an idle monitor in response to the determination.

10. A method of printer power management, comprising:
  receiving, by a processing resource, a power usage estimate from each of a plurality of components of a printing device;
  executing, by the processing resource, a deferred service routine on each of the plurality of components, wherein the deferred service routine, identifies a level of real-time power usage for each of the plurality of components;
  determining, by the processing resource, a state of a power supply coupled to the printing device relative to an over-power failure (OPF) of the power supply, based on the determined power usage and the power usage estimates;
  determining, by the processing resource, that the power supply is close to an imminent OPF based on the determined state of the power supply;
  informing, by the processing resource, the plurality of components about the determined imminent OPF; and
  managing, by the processing resource, printer power based on the determined imminent OPF within a threshold period of time.

11. The method of claim 10, wherein the plurality of components include printer motors, and wherein receiving the power usage estimate includes receiving the power usage estimate via printer motor control operations.

12. The method of claim 10, wherein:
  determining the state of the power supply includes determining that the OPF is likely to occur with a threshold level of certainty.

13. The method of claim 12, further comprising instructing printer motors in the printing device to decelerate responsive to the determination of the imminent OPF.

14. The method of claim 10, wherein determining the imminent OPF includes determining that the imminent OPF is unavoidable within the threshold period of time.

15. The method of claim 14, further comprising instructing printer motors in the printing device to decelerate responsive to the determination of the imminent OPF.

* * * * *